United States Patent [19]
Goss

[11] Patent Number: 6,053,461
[45] Date of Patent: Apr. 25, 2000

[54] REMOTE CONTROL STAND

[76] Inventor: Robert C. Goss, Rte. 1, Box 13A, Dixie, Ga. 31629

[21] Appl. No.: 09/262,175

[22] Filed: Mar. 4, 1999

[51] Int. Cl.[7] .............................. A45D 19/04; A47F 5/00; A47H 33/00
[52] U.S. Cl. ..................... 248/127; 248/123.2; 248/364
[58] Field of Search ................................ 248/127, 146, 248/519, 176.1, 499, 123.2, 364; 211/26.1; 119/789, 769, 792, 797, 798

[56] References Cited

U.S. PATENT DOCUMENTS

| | | | |
|---|---|---|---|
| 167,263 | 8/1875 | Maguire | 119/769 |
| 509,227 | 11/1893 | Kirby | 248/231.71 |
| 1,470,296 | 10/1923 | Stedman | 248/123.2 |
| 4,733,776 | 3/1988 | Ward | 206/305 |
| 4,735,377 | 4/1988 | Zuehsow | 242/379 |
| 5,127,615 | 7/1992 | Jones | 248/172 |
| 5,316,249 | 5/1994 | Anderson | 248/146 |
| 5,460,347 | 10/1995 | Schscher | 248/316.5 |

*Primary Examiner*—Ramon O. Ramirez
*Assistant Examiner*—David Heisey

[57] ABSTRACT

A remote control stand for supporting a remote control above a floor surface so that the remote control is easily retrievable by a user. The remote control stand includes a base with a tubular post upwardly extending from the base. The post has a top end with an opening into the lumen of the post. A first end of an elongate flexible member is extended into the lumen of the post through the opening of the top end of the post such that a second end of the elongate flexible member outwardly extends from the top end of the top post. A weight is disposed in the lumen of the post and coupled to the first end of the elongate flexible member. The second end of the elongate flexible member is designed for attaching a remote control thereto.

9 Claims, 3 Drawing Sheets

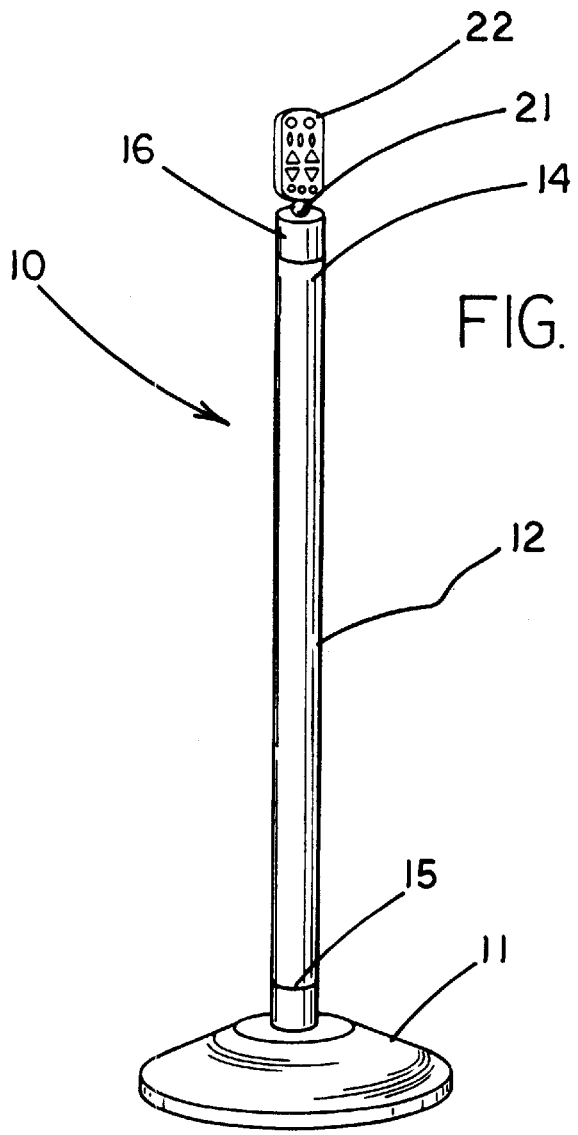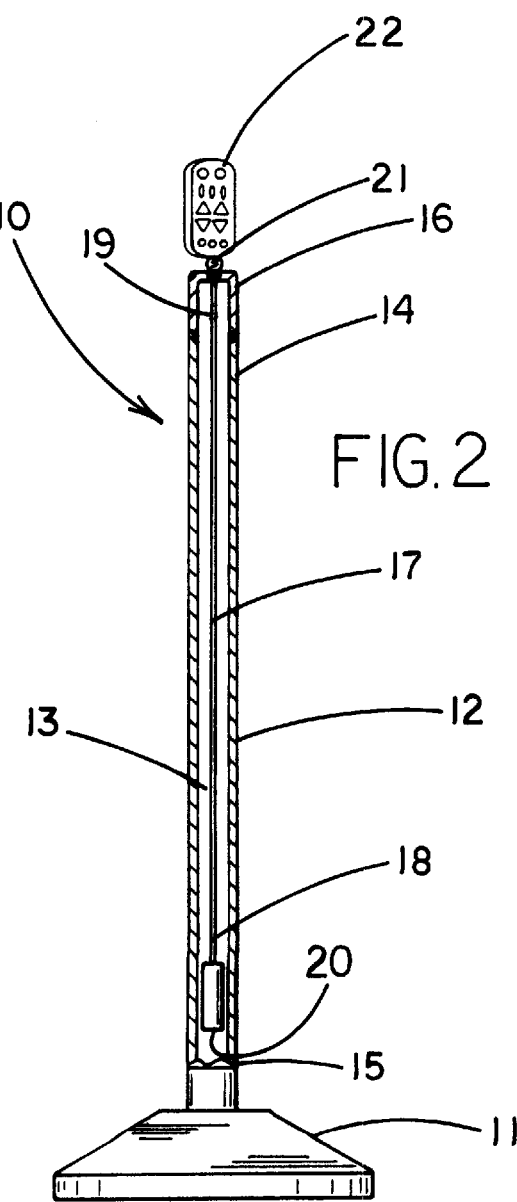

REMOTE CONTROL STAND

BACKGROUND OF THE INVENTION

1. Field of the Invention

The present invention relates to remote control stands and more particularly pertains to a new remote control stand for supporting a remote control above a floor surface so that the remote control is easily retrievable by a user.

2. Description of the Prior Art

The use of remote control stands is known in the prior art. More specifically, remote control stands heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,419,263; U.S. Pat. No. 5,316,249; U.S. Pat. No. Des. 365,177; U.S. Pat. No. 5,022,3551; U.S. Pat. No. 5,732,659; and U.S. Pat. No. 2,017,720.

While these devices fulfill their respective, particular objectives and requirements, the aforementioned patents do not disclose a new remote control stand. The inventive device includes a base with a tubular post upwardly extending from the base. The post has a top end with an opening into the lumen of the post. A first end of an elongate flexible member is extended into the lumen of the post through the opening of the top end of the post such that a second end of the elongate flexible member outwardly extends from the top end of the top post. A weight is disposed in the lumen of the post and coupled to the first end of the elongate flexible member. The second end of the elongate flexible member is designed for attaching a remote control thereto.

In these respects, the remote control stand according to the present invention substantially departs from the conventional concepts and designs of the prior art, and in so doing provides an apparatus primarily developed for the purpose of supporting a remote control above a floor surface so that the remote control is easily retrievable by a user.

SUMMARY OF THE INVENTION

In view of the foregoing disadvantages inherent in the known types of remote control stands now present in the prior art, the present invention provides a new remote control stand construction wherein the same can be utilized for supporting a remote control above a floor surface so that the remote control is easily retrievable by a user.

The general purpose of the present invention, which will be described subsequently in greater detail, is to provide a new remote control stand apparatus and method which has many of the advantages of the remote control stands mentioned heretofore and many novel features that result in a new remote control stand which is not anticipated, rendered obvious, suggested, or even implied by any of the prior art remote control stands, either alone or in any combination thereof.

To attain this, the present invention generally comprises a base with a tubular post upwardly extending from the base. The post has a top end with an opening into the lumen of the post. A first end of an elongate flexible member is extended into the lumen of the post through the opening of the top end of the post such that a second end of the elongate flexible member outwardly extends from the top end of the top post. A weight is disposed in the lumen of the post and coupled to the first end of the elongate flexible member. The second end of the elongate flexible member is designed for attaching a remote control thereto.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new remote control stand apparatus and method which has many of the advantages of the remote control stands mentioned heretofore and many novel features that result in a new remote control stand which is not anticipated, rendered obvious, suggested, or even implied by any of the prior art remote control stands, either alone or in any combination thereof.

It is another object of the present invention to provide a new remote control stand which may be easily and efficiently manufactured and marketed.

It is a further object of the present invention to provide a new remote control stand which is of a durable and reliable construction.

An even further object of the present invention is to provide a new remote control stand which is susceptible of a low cost of manufacture with regard to both materials and labor, and which accordingly is then susceptible of low prices of sale to the consuming public, thereby making such remote control stand economically available to the buying public.

Still yet another object of the present invention is to provide a new remote control stand which provides in the apparatuses and methods of the prior art some of the advantages thereof, while simultaneously overcoming some of the disadvantages normally associated therewith.

Still another object of the present invention is to provide a new remote control stand for supporting a remote control above a floor surface so that the remote control is easily retrievable by a user.

Yet another object of the present invention is to provide a new remote control stand which includes a base with a tubular post upwardly extending from the base. The post has a top end with an opening into the lumen of the post. A first end of an elongate flexible member is extended into the lumen of the post through the opening of the top end of the post such that a second end of the elongate flexible member outwardly extends from the top end of the top post. A weight is disposed in the lumen of the post and coupled to the first end of the elongate flexible member. The second end of the elongate flexible member is designed for attaching a remote control thereto.

Still yet another object of the present invention is to provide a new remote control stand that is ideal for holding television, video cassette player, and stereo remote controls proximal to a user's seat so that the user can easily grasp the remote control when needed.

Even still another object of the present invention is to provide a new remote control stand that helps eliminate the loss of remote controls and reduces the time spent looking for missing remote controls.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new remote control stand according to the present invention.

FIG. 2 is a schematic cross sectional view of the present invention.

DESCRIPTION OF THE PREFERRED EMBODIMENT

Figure 3:
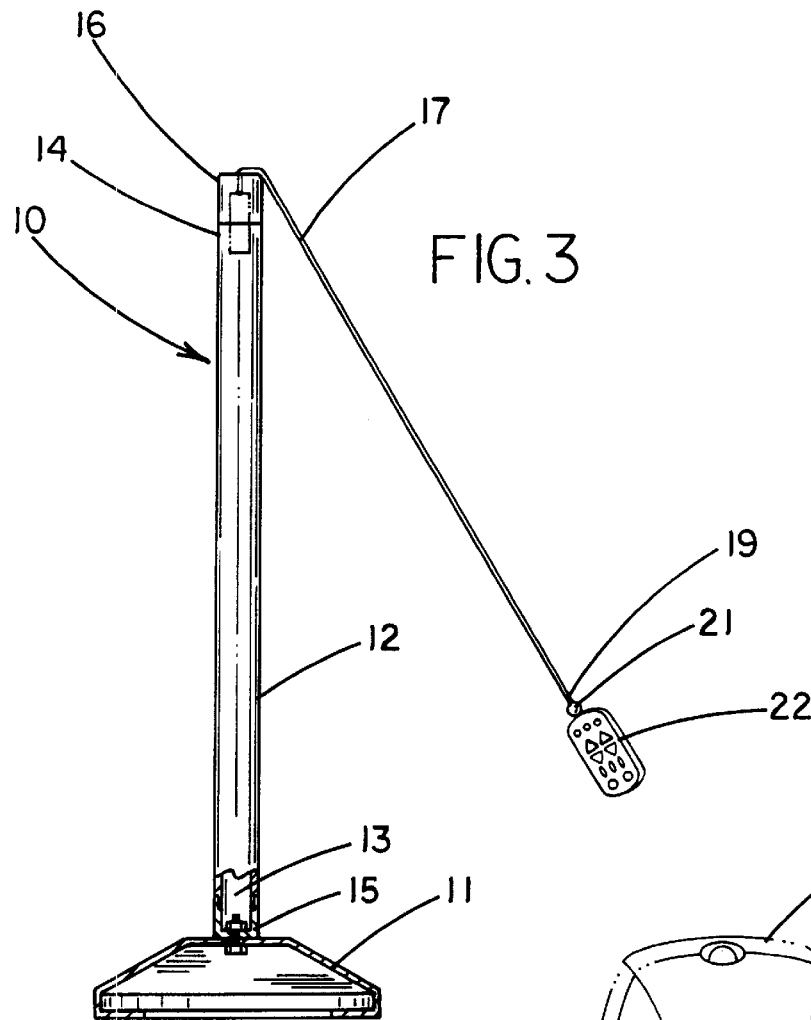
FIG. 3 is a schematic side view of the present invention with the elongate flexible member pulled out of the post.

With reference now to the drawings, and in particular to FIGS. 1 through 7 thereof, a new remote control stand embodying the principles and concepts of the present invention and generally designated by the reference numeral 10 will be described.

As best illustrated in FIGS. 1 through 7, the remote control stand 10 generally comprises a base with a tubular post upwardly extending from the base. The post has a top end with an opening into the lumen of the post. A first end of an elongate flexible member is extended into the lumen of the post through the opening of the top end of the post such that a second end of the elongate flexible member outwardly extends from the top end of the top post. A weight is disposed in the lumen of the post and coupled to the first end of the elongate flexible member. The second end of the elongate flexible member is designed for attaching a remote control thereto.

In closer detail, the remote control stand 10 comprises a base 11 for resting on a floor surface. While the base may be any shape, in one preferred embodiment, the base has a generally upwards tapering frusta-conical shape as illustrated in the Figures. Preferably, the base has a weight of at least about 3 lbs. to provide adequate stability to the remote control stand. Ideally, the base has a weight of about 5 lbs. for proving optimal stability while still is sufficiently light enough to be easily moved or carried by a user. In this ideal embodiment, the base has a diameter or width of about 10 inches to help provide optimal stability to the remote control stand when resting on a floor surface.

An elongate tubular post 12 is upwardly extended from the base. The post has a lumen 13, opposite top and bottom ends 14,15 and a longitudinal axis extending between the top and bottom ends of the post. The bottom end 15 of the post is coupled to the base so that the longitudinal axis of the post is preferably extended substantially perpendicular when the base is rested on a substantially horizontal floor surface.

The top end 14 of the post has an opening into the lumen of the post. Preferably, a top cap 16 substantially covers the top end of the post. The top cap has an aperture therethrough providing a passage into the lumen of the post through the opening of the top end of the post.

The post has a length defined between the top and bottom ends of the post of at least 1 foot and ideally about 3 feet to providing an optimal height of a user sitting in an easy chair to easily reach a remote control located at the top end of the post. The post preferably has a generally circular transverse cross section taken substantially perpendicular to the longitudinal axis of the post. Ideally, the post has a diameter defined perpendicular to the longitudinal axis of the post of about ¾ inch.

A first end 18 of an elongate flexible member 17 (such as a rope, string, cable or cord) is extended into the lumen of the post through the opening of the top end of the post. The elongate flexible member is extended through the aperture of the top cap such that a second end 19 of the elongate flexible member outwardly extends from the top end of the top post.

A generally cylindrical weight 20 is disposed in the lumen of the post and coupled to the first end of the elongate flexible member to gravitationally bias the first end of the elongate flexible member downwards towards the bottom end of the post.

Preferably, a generally spherical stop 21 is coupled to the second end of the elongate flexible member. The stop has a diameter greater than a diameter of the aperture of the top cap (or opening of the top end of the post if no top cap is present) to prevent passage of the stop and second end of the elongate flexible member through the aperture into the lumen of the post.

The second end of the elongate flexible member is designed for attaching thereto a remote control 22 for an electronic device such as a television, a VCR, or a stereo.

Figure 4:
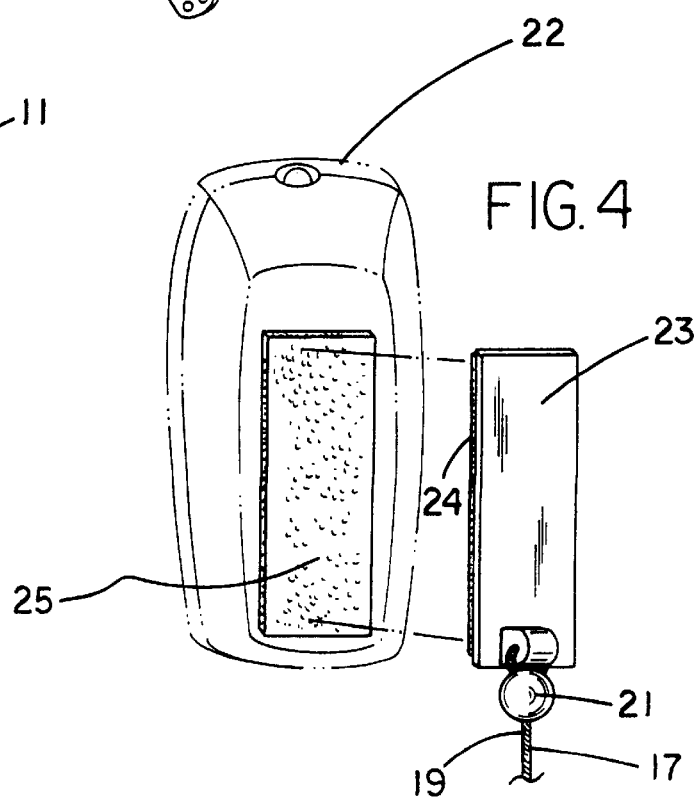
FIG. 4 is a schematic enlarged perspective view of one embodiment of the coupling of a remote control to the second end of the elongate flexible member.

With reference to FIG. 4, in one embodiment, a generally rectangular plate 23 is coupled to the second end of the elongate flexible member and the remote control is attached to the plate. Preferably, a hook and loop fastener detachably attached the plate to the remote control. The hook and loop fastener has a pair of attachable complementary portions 24,25 (i.e., a hooks portion and a loops portion). One of the complementary portions is provided on the plate and the other of the complementary portions is provided on the remote control such that contact of the complementary portions to one another attaches the remote control to the plate.

Figure 5:
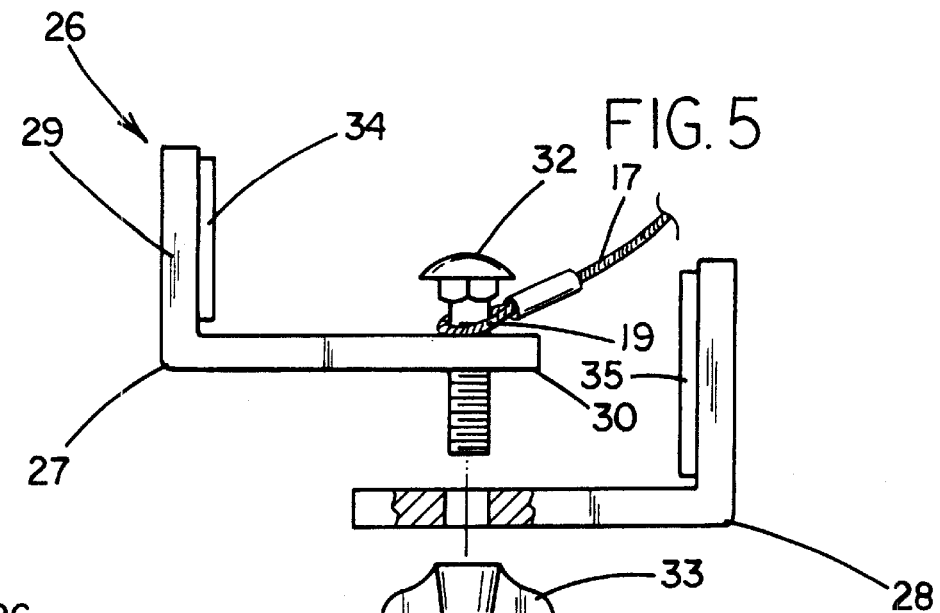
FIG. 5 is a schematic exploded view of an embodiment of the present invention with a clamp.
Figure 6:
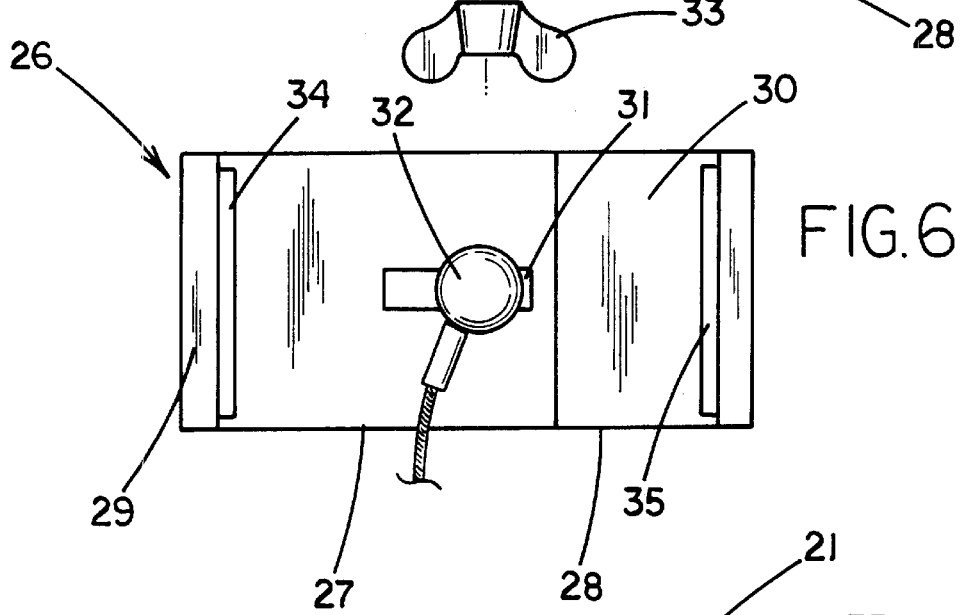
FIG. 6 is a schematic side view of the clamp.
Figure 7:
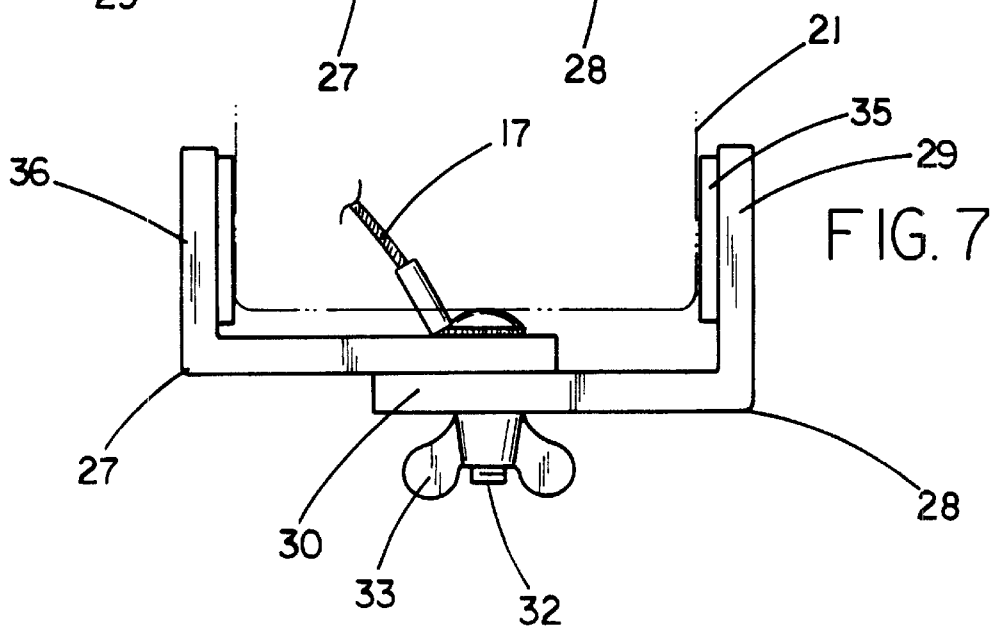
FIG. 7 is a schematic bottom view of the clamp.

FIGS. 5, 6 and 7 illustrate another preferred embodiment where a clamp 26 coupled to the second end of the elongate flexible member attaches the remote control to the second end of the elongate flexible member. The clamp member comprises an opposing pair of generally L-shaped arms 27,28 each having upper and lower portions 29,30 extending generally perpendicular to one another. The lower portions of the arms are adjustably coupled together so that the upper portions of the arms are spaced apart from one another and the arms are adjustable to permit adjustment of the distance of the space between the upper portions. The lower portions of each of the arms has a hole therethrough. Preferably as illustrated in FIG. 7, the hole of one of the arms is an elongate slot 31 running along the length of the respective lower portion to permit adjustment of the relative position of the arms.

A threaded fastener 32 is extended through the holes of the arms. A nut 33 is threaded onto the threaded fastener such that the lower portions are positioned between the threaded fastener and nut to couple the arms together. The second end of the elongate flexible member is looped around the threaded fastener to couple the second end of the elongate flexible member to the clamp.

The upper portions of the arms are designed for holding a remote control therebetween to couple the remote control to the second end of the elongate flexible member. Preferably, the upper portions of the arms have resiliently deformable pads 34,35 facing one another to help securely hold the remote control between the upper portions of the arms.

In use, the stand 10 is positioned at a location near a user. When the user wants to use the remote control, the user grabs the remote control and pulls to extend the elongate flexible member out of the post and raises the weight towards the top end of the post. When the user lets go of the remote control, the weight in the post drops down towards the bottom end of the post thereby pulling the elongate flexible member back into the post and positioning the remote control back adjacent the top end of the post.

As to a further discussion of the manner of usage and operation of the present invention, the same should be apparent rom the above description. Accordingly, no further discussion elating to the manner of usage and operation will be provided.

With respect to the above description then, it is to be realized hat the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A remote control stand, comprising:

a base;

a tubular post upwardly extending from said base, said post having a lumen, and a top end;

said top end of said post having an opening into said lumen of said post;

an elongate flexible member having a pair of opposite ends, a first of said ends of said elongate flexible member being extended into said lumen of said post through said opening of said top end of said post such that a second of said ends of said elongate flexible member outwardly extends from said top end of said top post;

a weight being disposed in said lumen of said post, said weight being coupled to said first end of said elongate flexible member;

said second end of said elongate flexible member being adapted for attaching a remote control thereto; and wherein said base has a diameter of about 10 inches for facilitating optimal stability to the remote control stand when resting on a floor surface, said post being mounted to a center of said base.

2. The remote control stand of claim 1, wherein a top cap substantially covers said top end of said post, said top cap having an aperture therethrough providing a passage into said lumen of said post through said opening of said top end of said post, said elongate flexible member being extended through said aperture of said top cap.

3. The remote control stand of claim 2, further comprising a stop being coupled to said second end of said elongate flexible member.

4. The remote control stand of claim 1, wherein a plate is coupled to said second end of said elongate flexible member, said plate being adapted for attachment to a remote control.

5. The remote control stand of claim 4, wherein said plate has a hook and loop fastener for detachably attaching said plate to the remote control.

6. The remote control stand of claim 1, further comprising a clamp being coupled to said second end of said elongate flexible member, said clamp being adapted for attaching a remote control to said second end of said elongate flexible member.

7. The remote control stand of claim 6, wherein said clamp member comprises a pair of generally L-shaped arms each having upper and lower portions extending generally perpendicular to one another, said lower portions of said arms being adjustably coupled together so that said upper portions of said arms are spaced apart from one another and said arms are adjustable to permit adjustment of the distance of the space between said upper portions, said clamp being coupled to said second end of said elongate flexible member, said upper portions of said arms being adapted for holding a remote control therebetween to couple the remote control to said second end of said elongate flexible member.

8. The remote control stand of claim 7, wherein said upper portions of said arms have resiliently deformable pads facing one another.

9. A remote control stand, comprising:

a base for resting on a floor surface, said base having a generally upwards tapering frusta-conical shape, said base having a weight of about 5 pounds for providing optimal stability while being light enough to be easily moved;

said base having a diameter of about 10 inches for facilitating optimal stability to the remote control stand when resting on a floor surface, said post being mounted to a center of said base;

an elongate tubular post upwardly extending from said base, said post having a lumen, and opposite top and bottom ends;

said top end of said post having an opening into said lumen of said post;

wherein a top cap substantially covers said top end of said post, said top cap having an aperture therethrough providing a passage into said lumen of said post through said opening of said top end of said post;

said bottom end of said post being coupled to said base;

said longitudinal axis of said post being extended substantially perpendicular when said base is rested on a substantially horizontal surface;

said post having a length defined between said top and bottom ends of said post of about 3 feet for providing optimal height for a user sitting said post having a generally circular transverse cross section taken substantially perpendicular to said longitudinal axis of said post;

an elongate flexible member having a pair of opposite ends, a first of said ends of said elongate flexible member being extended into said lumen of said post through said opening of said top end of said post, said elongate flexible member being extended through said aperture of said top cap such that a second of said ends of said elongate flexible member outwardly extends from said top end of said top post;

a weight being disposed in said lumen of said post, said weight being coupled to said first end of said elongate flexible member to bias said first end of said elongate flexible member downwards towards said bottom end of said post;

a stop being coupled to said second end of said elongate flexible member, said stop having a diameter greater than a diameter of said aperture of said top cap;

a generally rectangular plate being coupled to said second end of said elongate flexible member;

a remote control; and a hook and loop fastener detachably attaching said plate to the remote control, said hook and loop fastener having a pair of complementary portions, one of said complementary portions being provided on said plate, the other of said complementary portions being provided on the remote control.

\* \* \* \* \*